(12) United States Patent
Xiao et al.

(10) Patent No.: US 12,447,686 B2
(45) Date of Patent: Oct. 21, 2025

(54) FIVE-AXIS LINKAGE 3D PRINTER

(71) Applicant: WUXI YOUTINN WUWEI ADDITIVE TECHNOLOGY CO., LTD., Jiangsu (CN)

(72) Inventors: Guodong Xiao, Jiangsu (CN); Qian Yu, Jiangsu (CN)

(73) Assignee: WUXI YOUTINN WUWEI ADDITIVE TECHNOLOGY CO., LTD. (CN)

( * ) Notice: Subject to any disclaimer, the term of this patent is extended or adjusted under 35 U.S.C. 154(b) by 0 days.

(21) Appl. No.: 18/010,579

(22) PCT Filed: Jun. 28, 2022

(86) PCT No.: PCT/CN2022/101703
§ 371 (c)(1),
(2) Date: Dec. 15, 2022

(87) PCT Pub. No.: WO2023/087715
PCT Pub. Date: May 25, 2023

(65) Prior Publication Data
US 2024/0140038 A1    May 2, 2024

(30) Foreign Application Priority Data
Nov. 17, 2021  (CN) .......................... 202111362273.7

(51) Int. Cl.
*B29C 64/393*    (2017.01)
*B29C 64/232*    (2017.01)
(Continued)

(52) U.S. Cl.
CPC .......... *B29C 64/393* (2017.08); *B29C 64/232* (2017.08); *B29C 64/236* (2017.08);
(Continued)

(58) Field of Classification Search
CPC ... B29C 64/227; B29C 64/232; B29C 64/236; B29C 64/241
See application file for complete search history.

(56) References Cited

U.S. PATENT DOCUMENTS

2014/0197576 A1* 7/2014 Kraibuhler ............. B33Y 10/00
                                                              425/375
2016/0151833 A1* 6/2016 Tsao ......................... B23K 9/04
                                                               219/136

FOREIGN PATENT DOCUMENTS

CN    206201478         5/2017
CN    107457995 A  * 12/2017 ............. B33Y 50/00
(Continued)

OTHER PUBLICATIONS

SIPO (Chinese) Office Action for Application 202111362273.7, Mar. 30, 2024 (Year: 2024).*
(Continued)

*Primary Examiner* — Timothy Kennedy
(74) *Attorney, Agent, or Firm* — Onello & Mello P.C.

(57) ABSTRACT

A five-axis linkage 3D printer is provided. In the device, a base material driving unit is configured to drive and control a base material to rotate on a base; a nozzle driving unit is configured to control the position of a nozzle of the 3D printer in a horizontal direction and a vertical direction; a scanning unit is configured to scan and photograph movement trajectory of the base material and transmit information of the movement trajectory to an electric control system; and the electric control system is configured to collect the information of the scanning unit and controlling movement of the nozzle driving unit and the base material driving unit. A trapezoidal swing arm is used so that the rotation center is lower than the rotation center of the swing arm, and the height of the rotary table is reduced.

8 Claims, 1 Drawing Sheet

(51) Int. Cl.
*B29C 64/236* (2017.01)
*B29C 64/241* (2017.01)
*B29C 64/245* (2017.01)
*B33Y 30/00* (2015.01)
*B33Y 50/02* (2015.01)

(52) U.S. Cl.
CPC .......... *B29C 64/241* (2017.08); *B29C 64/245* (2017.08); *B33Y 30/00* (2014.12); *B33Y 50/02* (2014.12)

(56) References Cited

FOREIGN PATENT DOCUMENTS

| | | | | |
|---|---|---|---|---|
| CN | 211467488 | 9/2020 | | |
| CN | 112622260 | 4/2021 | | |
| CN | 113997569 | 2/2022 | | |
| CN | 216635400 | 5/2022 | | |
| EP | 3482914 A1 | * | 5/2019 | ............. B33Y 50/02 |
| KR | 20150120643 A | * | 10/2015 | ........... B29C 64/118 |
| WO | 2020263205 | 12/2020 | | |

OTHER PUBLICATIONS

International Search Report dated Nov. 11, 2021 issued in corresponding International Application No. PCT/CN2022/101703.

\* cited by examiner

FIVE-AXIS LINKAGE 3D PRINTER

CROSS REFERENCE TO RELATED APPLICATION(S)

This patent application is a national stage of International Application PCT/CN2022/101703, filed on Jun. 28, 2022, which claims the priority to Chinese Patent Application No. 202111362273.7 filed with China National Intellectual Property Administration on Nov. 17, 2021, the disclosure of which is incorporated by reference herein in its entirety.

TECHNICAL FIELD

The present disclosure relates to the field of 3D printers, in particular to a five-axis linkage 3D printer.

BACKGROUND 3D printing technology, as one of rapid prototyping manufacturing technologies, is also known as additive manufacturing, and is a technology for constructing objects in a layer-by-layer printing mode by using powdery metal or plastic and other adhesive materials on the basis of a digital model file. An existing 3D printer is generally a three-axis printer, which is based on cumulative printing on a plane. Printing workpieces requires accurate positioning, so that printing time is long, and it is difficult to print workpieces.

SUMMARY

In order to add two dimensions to traditional 3D printing, 360-degree rotation on the horizontal plane and plus-minus 90-degree rotation on the left and right sides are achieved in the printing process. Meanwhile, the printing efficiency is improved, multi-dimensional printing is achieved, printing time is saved, and printing cost is reduced. The present disclosure adopts the following technical solution.

A five-axis linkage 3D printer comprises a nozzle driving unit, a base material driving unit, a base, an electric control system, a scanning unit and a computer;

the base material driving unit is configured to drive and control the base material to rotate on the base; and
the nozzle driving unit is configured to control a position of a nozzle of the 3D printer in a horizontal direction and a vertical direction. The nozzle driving unit comprises a first servo module, a second servo module and a third servo sliding table module; the first servo module is fixedly installed on the base; the second servo module is connected to the first servo module in a sliding way, a driving direction of the first servo module is perpendicular to a driving direction of the second servo module in the same horizontal plane, a sliding table of the second servo module is connected to the third servo sliding table module in a sliding way, and a driving direction of the third servo sliding table module is vertically downward; and the nozzle is connected to the third servo sliding table module in a sliding way. The moving precision of the nozzle can be effectively improved through the servo sliding table module, the position of the nozzle is controlled in the x-axis direction, the y-axis direction and the z-axis direction through the first servo module, the second servo module and the third servo sliding table module respectively, so that the accuracy of the omnidirectional position of the nozzle is improved.

the scanning unit is configured to scan and photograph the movement trajectory of the base material and transmit information of the movement trajectory to the computer;
the electric control system is electrically connected to the base material driving unit, the first servo module, the second servo module, the third servo sliding table module and the nozzle, and is configured to control movements of the first servo module, the second servo module, the third servo sliding table module and the base material driving unit; and the electric control system is communicatively connected to the computer. The base material driving unit and the nozzle driving unit can be effectively controlled to cooperate with each other through the electric control system, so that the accuracy of 3D printing is improved.

A control program is provided in the computer, and comprises a coordinate calibration module, a scanning module, a repairing module, a registration module, a trajectory planning module and a control module.

With the coordinate calibration module, when a camera scans an object and a nozzle driving unit operates, a coordinate system of the scanning unit and a coordinate system of the nozzle driving unit are two different coordinate systems. In the absence of unified coordinate systems, the shaped objects scanned by the camera are not at the same position in a coordinate system of a machine tool. Therefore, the coordinate calibration module accurately calculates coordinate dots through an image recognition algorithm, and the coordinate system of the scanned object and the coordinate system of the nozzle driving module are unified after matrix operation.

The scanning module is configured to receive data transmitted by the scanning module, convert the data into three-dimensional model data, and transfer the model from the coordinate system of the scanning unit to the coordinate system of the nozzle driving unit after passing through the coordinate calibration module.

With the repairing module, in the scanning process of the camera, due to illumination, color, operation and other reasons, the scanned model has the problems of holes, cracks, reversion and the like. In the printing process, after the camera confirms the scanning model, the system reads the scanning model, and the repairing module automatically repairs the object. The repairing process is as follows: on the three-dimensional model of the object to be printed, all half edges without a partner half edge are found through a half-edge structure and stored in a container A1; information of a circle of holes connected end to end, namely vector <hole>, is acquired through the container A1; all hole information on the model, namely vector <vector<hole>>, is acquired by traversing the container A1; the area weighted normal direction and the included angle of each point in each hole are calculated; the flatness of each point is calculated; the flatness of all points is sorted; the hole is filled from the point with the lowest flatness, and if the flatness of the point is less than 90°, and other hole points are not framed in the filled surface patch, the hole is filled; otherwise, the next point is judged; and the previous step is looped through until all the holes are filled. The repairing module is also configured to convert the coordinates of the model and automatically converting the model from a coordinate system of the camera to the coordinate system of the machine tool.

The registration module is configured to modify and register the scanned three-dimensional model. According to the physical size of the object to be printed, the three-dimensional model is scaled at any scale as required; the object to be printed is rotated, and the three-dimensional model is moved to the object to be printed; and the three-dimensional model and the object to be printed are intersected to complete the registration. The scanning module projects the repaired three-dimensional model data to the coordinate system of the machine tool through the projection relation between a coordinate system of a scanner and the coordinate system of the machine tool. The registration module is also configured to add and modify the shape of the three-dimensional model or set position parameters uniformly.

The trajectory planning module is configured to plan printing trajectory planning according to the driving characteristics of the nozzle driving unit after scanning, repairing and registering processes. The planning process is as follows: a proper layered curved surface is selected according to demands; Boolean intersection is carried out on the layered curved surface and the three-dimensional model to obtain an intersection line of the layered curved surface and the three-dimensional model, the inner contour and the outer contour are classified, and the inner contour and the outer contour are matched to determine filling areas; for each filling area, an initial filling trajectory is determined according to a filling mode; the filling area is covered by offset of the initial filling trajectory, the filling trajectory is cut through the boundary contour of the filling area, trajectories outside the filling area are removed to obtain the actual filling trajectory; and according to the thickness of the process layer, the layered curved surface is offset equidistantly to obtain the next layered curved surface, and the above steps are repeated until there is no intersection area between the layered curved surface and the printing model. The trajectory planning module automatically converts the intermediate path into an NC code and sends a G code to the control module through a numerical control module.

The control module is configured to receive a trajectory path planning instruction and transmit the trajectory path planning instruction to the electric control system.

Specifically, the base material driving unit comprises a trapezoidal swing arm, a first driving motor and a second driving motor; and the swing arm is trapezoidal and lengthened, and the structure is high in stability and rigidity, so that the machining precision is high. In order to enable the height of the whole structure of the machine tool within a proper range, a groove is arranged on the base, the trapezoidal swing arm is arranged in the groove, two ends of the trapezoidal swing arm are rotatably connected to the base respectively. The first driving motor is rotatably connected to the bottom of the trapezoidal swing arm, and the second driving motor is fixedly connected to one end of the trapezoidal swing arm, so that the center of the rotating shaft of the rotary table is arranged below the center of the rotating shaft of a cradle arm. Therefore, a lower semicircle is formed when the rotating shaft of the cradle arm rotates by plus or minus 90 degrees, so that the overall height and cost of the body can be reduced.

Specifically, the scanning unit comprises a camera and an adjusting support; and the adjusting support is fixedly installed on the base, the camera is fixedly connected to one end of the adjusting support, and the adjusting support can adjust the distance between the camera and the base. The adjusting support comprises an L-shaped support and a connecting rod. The L-shaped support is fixedly installed on the base, a fixed plate is arranged at one end of the connecting rod, the camera is fixedly installed on the fixed plate, a locking piece is arranged on the L-shaped support, the connecting rod penetrates through the L-shaped support, and the locking piece locks the connecting rod. Different positions on the connecting rod are locked through the locking piece, and the distance between the camera and the base can be adjusted through the adjusting support.

Specifically, a T-shaped support is arranged on a sliding block of the second servo module, one end of the T-shaped support is fixedly connected to the sliding block, the other end of the T-shaped support is fixedly connected to the third servo sliding table module, and the driving direction of the third servo sliding table module is vertically downward.

Specifically, the first driving motor is a harmonic drive. The harmonic drive has the advantages of being large in transmission speed ratio, high in bearing capacity, high in transmission precision, high in transmission efficiency, stable in movement, simple in structure, convenient to install, small in size, light in weight and low in cost.

Specifically, the second driving motor is a harmonic drive.

Specifically, a fixed support and a supporting seat are arranged on the base, a first bearing seat is arranged on the fixed support, the first bearing seat is rotatably connected to one end of the trapezoidal swing arm, the nozzle driving unit is fixedly installed on the supporting seat, a second bearing seat is arranged on the side wall of the supporting seat, and the second bearing seat is rotatably connected to the other end of the trapezoidal swing arm; and the first bearing seat and the second bearing seat are located at the same height.

Specifically, the electric control system includes an electric control cabinet, a control card system is arranged in the electric control cabinet, and the control card system is electrically connected to the base material driving unit, the first servo module, the second servo module, the third servo sliding table module, the nozzle and the scanning unit.

In conclusion, the device in the present disclosure has the following advantages.

The driving device realizes accurate control of the position of the nozzle in the x-axis direction, the y-axis direction and the z-axis direction through the nozzle driving unit. Through the base material driving unit, the rotary table is placed inside a groove of the base. A trapezoidal swing arm is used, so that the rotation center of the rotary table is lower than the rotation center of the swing arm, and the height of the rotary table is reduced. Therefore, the overall height of the driving device is reduced, and the cost is also reduced. Five-axis movement is achieved through the nozzle driving unit and the base material driving unit, and the nozzle can be moved to any position in a workpiece coordinate system, so that the difficulty in printing workpieces can be greatly reduced, and the printing time is shortened. Workpieces with complicated shapes which cannot be achieved by a three-axis 3D machine can be manufactured, and supporting materials are saved for printing various complicated parts, so that the material utilization rate is improved, the printing time and cost are saved, and the green and efficient printing effect is achieved.

Reference signs in the figures: 1, first servo module; 2, second servo module; 3, third servo sliding table module; 4, base; 5, trapezoidal swing arm; 6, nozzle; 7, T-shaped support; 8, groove; 9, first driving motor; 10, second driving motor; 11, second bearing seat; 12, fixed support; 13, first bearing seat; 14, supporting seat; 15, camera; and 16, sliding table.

DETAILED DESCRIPTION OF THE EMBODIMENTS

Figure 1:
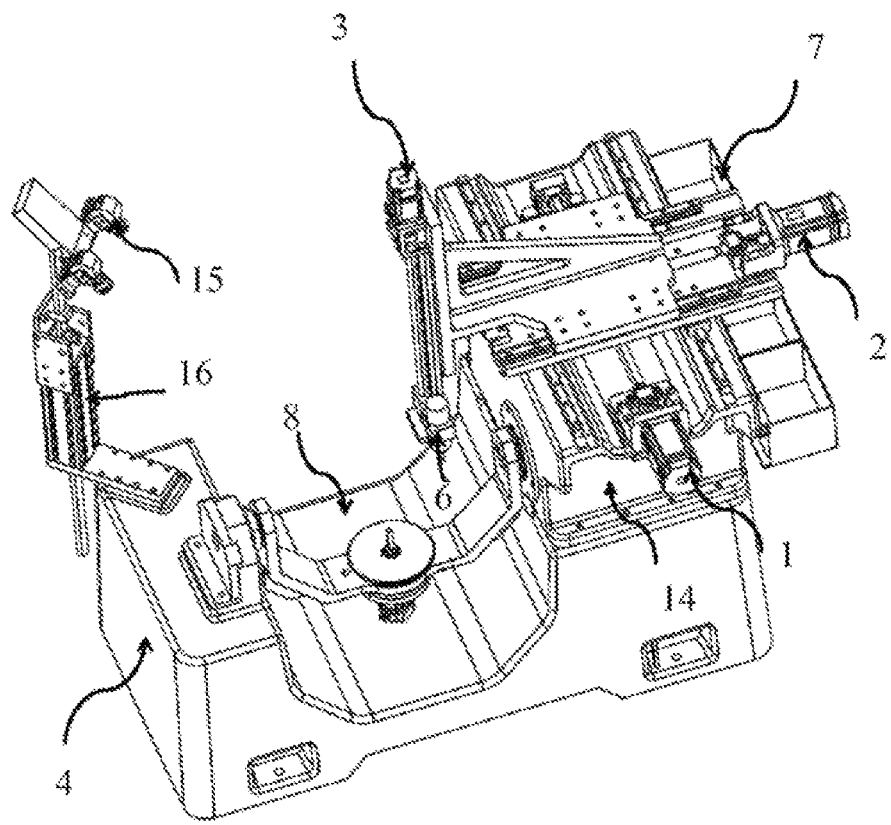
FIG. 1 is a structural schematic diagram of a five-axis linkage 3D printer.
Figure 2:
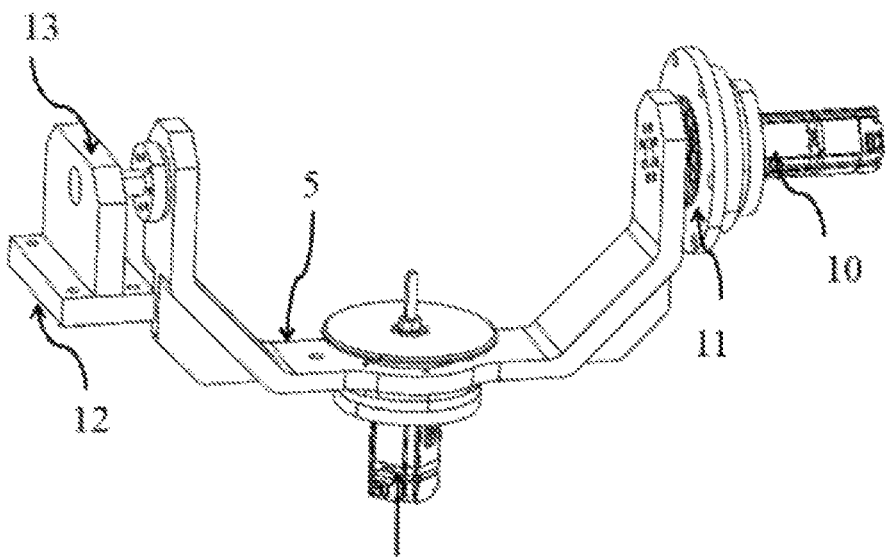
FIG. 2 is a structural schematic diagram of a base material driving unit in a five-axis linkage 3D printer.

The present disclosure is further described below in combination with FIG. 1 and FIG. 2.

A five-axis linkage 3D printer includes a nozzle 6, a nozzle driving unit, a base material driving unit, a base 4, an electric control system, a scanning unit and a computer.

The base material driving unit includes a trapezoidal swing arm 5, a first driving motor 9 and a second driving motor 10. The swing arm is trapezoidal and lengthened, and such structure is high in stability and rigidity, so that the machining precision is high. In order to enable the height of the whole structure of the machine tool to be within a proper range, a groove 8 is provided on the base 4. In order to enable the base material driving unit to be arranged in the groove 8, a fixed support 12 and a supporting seat 14 are arranged on the base 4. A first bearing seat 13 is arranged on the fixed support 12, and is rotatably connected to one end of the trapezoidal swing arm 5; a second bearing seat 11 is arranged on the side wall of the supporting seat 14 and is rotatably connected to the other end of the trapezoidal swing arm 5. The first bearing seat 13 and the second bearing seat 11 are located at the same height, so that the base material driving unit is arranged in the groove 8. In order to enable a printing substrate to rotate and a center of a rotating shaft of a rotary table to be arranged below a center of a rotating shaft of a cradle arm, the first driving motor 9 is rotatably connected to the bottom of the trapezoidal swing arm 5. Therefore, a lower semicircle is formed when the rotating shaft of the cradle arm rotates by plus or minus 90 degrees, so that overall height and cost of the body can be reduced. The first driving motor 9 and the second driving motor 10 are both harmonic drive. The harmonic drive has the advantages of being large in transmission speed ratio, high in bearing capacity, high in transmission precision, high in transmission efficiency, stable in movement, simple in structure, convenient to install, small in size, light in weight and low in cost.

The nozzle driving unit is configured to control the position of a nozzle 6 of the 3D printer in the horizontal direction and the vertical direction. The nozzle driving unit includes a first servo module 1, a second servo module 2 and a third servo sliding table module 3. The first servo module 1 is fixedly installed on the base 4. The second servo module 2 is connected to the first servo module 1 in a sliding way. The driving direction of the first servo module 1 is perpendicular to the driving direction of the second servo module 2 in the same horizontal plane. A T-shaped support 7 is arranged on a sliding block of the second servo module 2, one end of the T-shaped support 7 is fixedly connected to the sliding block, the other end of the T-shaped support is fixedly connected to the third servo sliding table module 3, and the driving direction of the third servo sliding table module 3 is vertically downward. The nozzle 6 is connected to a sliding block of the third servo sliding table module 3. The moving precision of the nozzle 6 can be effectively improved through the servo sliding table module, and the position of the nozzle 6 is controlled in the x-axis direction, the y-axis direction and the z-axis direction by the first servo module 1, the second servo module 2 and the third servo sliding table module 3 respectively, so that the accuracy of the omnidirectional position of the nozzle 6 is improved.

The scanning unit is configured to scan and photograph the movement trajectory of the base material and transmit information of the movement trajectory to the computer. The scanning unit includes a camera and an adjusting support. The adjusting support is fixedly installed on the base, the camera is fixedly connected to one end of the adjusting support, and the adjusting support can adjust the distance between the camera and the base. The adjusting support includes an L-shaped support and a connecting rod. The L-shaped support is fixedly installed on the base, a fixed plate is arranged at one end of the connecting rod, the camera is fixedly installed on the fixed plate, a locking piece is arranged on the L-shaped support, the connecting rod penetrates through the L-shaped support, and the locking piece locks the connecting rod. Different positions on the connecting rod are locked by the locking piece, and the distance between the camera and the base can be adjusted by the adjusting support.

The electric control system comprises an electric control cabinet, a control card system is arranged in the electric control cabinet, and the control card system is electrically connected to the first driving motor 9, the second driving motor 10, the first servo module 1, the second servo module 2 and the third servo sliding table module 3, and the electric control system is communicatively connected to the computer. With the control card system in the electric control system, the base material driving unit and the nozzle driving unit can be effectively controlled to cooperate with each other, so that the accuracy of 3D printing is improved.

The computer is embodied with a control program, which includes a coordinate calibration module, a scanning module, a repairing module, a registration module, a trajectory planning module and a control module.

The coordinate calibration module is described now. When a camera scans an object and a nozzle driving unit operates, a coordinate system of the scanning unit and a coordinate system of the nozzle driving unit are two different coordinate systems. In the absence of unified coordinate systems, the formed object scanned by the camera is not at the same position in a coordinate system of a machine tool. Therefore, the coordinate calibration module accurately calculates coordinate dots through an image recognition algorithm, and the coordinate system of the scanned object and the coordinate system of the nozzle driving module are unified after matrix operation.

The scanning module is configured to receive data transmitted by the scanning module, convert the data into three-dimensional model data, and transform the model from the coordinate system of the scanning unit to the coordinate system of the nozzle driving unit after passing through the coordinate calibration module.

The repairing module is described now. In the scanning process of the camera, due to illumination, color, operation and other reasons, the scanned model has the problems of holes, cracks, reversion and the like. In the printing process, after confirmation of the camera, the system reads the scanning model, and the repairing module automatically repairs the object. The repairing process is as follows. Firstly, on the three-dimensional model of the object to be printed, all half edges without a partner half edge are found through a half-edge structure and stored in a container A1; then, information about a ring of end-to-end holes, namely vector <hole>, is acquired through the container A1; next, all hole information on the model, namely vector <vector<hole>>, is acquired by traversing the container A1; yet, the area weighted normal direction and the included angle of each point in each hole are calculated; the flatness of each point is calculated; the flatness of all points is sorted; the hole filling starts from the point with the lowest flatness, and if the flatness of the point is less than 90° and other hole points are not framed in the filled surface patch, the hole filling is performed; otherwise, the next point is judged; and the previous hole filling step is circularly executed until all the holes are filled. The repairing module is also configured to transform the coordinates of the model and automatically transform the model from a coordinate system of the camera to the coordinate system of the machine tool.

The registration module is configured to modify and register the scanned three-dimensional model. According to the physical size of the object to be printed, the three-dimensional model is scaled at any scale as required; the object to be printed is rotated, and the three-dimensional model is moved to the object to be printed; and the three-dimensional model and the object to be printed are intersected to complete the registration. The scanning module projects the repaired three-dimensional model data to the coordinate system of the machine tool through the projection relation between a coordinate system of a scanner and the coordinate system of the machine tool. The registration module is also configured to add and modify the shape of the three-dimensional model or set position parameters uniformly through the registration module.

The trajectory planning module is configured to plan printing trajectory according to the driving characteristics of the nozzle driving unit after scanning, repairing and registering processes. The planning process is described as follows: a proper layered curved surface is selected according to demands; Boolean intersection is carried out on the layered curved surface and the three-dimensional model to obtain an intersection line of the layered curved surface and the three-dimensional model, the contours are classified into the inner contour and the outer contour, and the inner contour and the outer contour are matched to determine filling areas; for each filling area, an initial filling trajectory is determined according to a filling mode; the filling area is covered by offset of the initial filling trajectory, finally, the filling trajectory is cut through the boundary contour of the filling area, to remove trajectories outside the filling area and in turn obtain the actual filling trajectory; and according to the thickness of the process layer, the layered curved surface is offset equidistantly to obtain the next layered curved surface, and the above steps are repeated until there is no intersection area between the layered curved surface and the printing model. The trajectory planning module automatically converts the intermediate path into an NC code and sends a G code to the control module through a numerical control module.

The control module is configured to receive a trajectory path planning instruction and transmit the trajectory path planning instruction to the electric control system.

The working process of the five-axis linkage 3D printer is as follows: after the camera is fixed to a proper position, the electric control system controls the first driving motor to rotate, and the camera scans a solid model to be printed into three-dimensional model data to the computer. In the computer, a coordinate system of a scanned object and a coordinate system of the nozzle driving module are unified through the coordinate calibration module. The received three-dimensional model is repaired through the repairing module, registration is carried out through the registration module, and printing trajectory planning is carried out on the registered three-dimensional model through the trajectory planning module according to the driving characteristics of the nozzle driving unit. The trajectory planning module automatically converts the intermediate path into an NC code, sends G code to the control module through the numerical control module, and finally transmits the trajectory path planning instruction to the electric control system through the control module. The electric control system operates according to the instruction to achieve 3D printing.

In conclusion, the embodiments have the following advantages. The driving device realizes accurate control of the position of the nozzle in the x-axis direction, the y-axis direction and the z-axis direction through the nozzle driving unit. Through the base material driving unit, the rotary table is placed inside a groove of the base. A trapezoidal swing arm is used, so that the rotation center of the rotary table is lower than the rotation center of the swing arm, and the height of the rotary table is reduced. Therefore, the overall height of the driving device is reduced, and the cost is also reduced. Five-axis movement is achieved through the nozzle driving unit and the base material driving unit, and the nozzle can be moved to any position in a workpiece coordinate system, so that the difficulty in printing workpieces can be greatly reduced, and the printing time is shortened. Workpieces with complicated shapes which cannot be achieved by a three-axis 3D machine can be manufactured, and supporting materials are saved for printing various complicated parts, so that the material utilization rate is improved, the printing time and cost are saved, and the green and efficient printing effect is achieved.

It can be understood that the above detailed description of the present disclosure is merely illustrative of the present disclosure but is not limited to the technical solutions described in the embodiments of the present disclosure. Those skilled in the art should understand that modifications or equivalent substitutions of the present disclosure may still be made to achieve the same technical effect; and as long as the use requirements are met, it is within the protection range of the present disclosure.

What is claimed is:

1. A five-axis linkage 3D printer, comprising a nozzle driving unit, a base material driving unit, a base, an electric control system, a scanning unit and a computer, wherein
the base material driving unit is configured to drive and control a base material to rotate on the base;
the nozzle driving unit comprises a first servo module, a second servo module, a third servo sliding table module and a nozzle; the first servo module is arranged on the base; the second servo module is connected to the first servo module in a sliding way, a driving direction of the first servo module is perpendicular to a driving direction of the second servo module, a sliding table of the second servo module is connected to the third servo sliding table module in a sliding way, and a driving direction of the third servo sliding table module is perpendicular to the driving direction of the first servo module and the driving direction of the second servo module; the nozzle is connected to the third servo sliding table module in a sliding way;
the scanning unit is configured to scan and photograph movement trajectory of the base material and transmit information of the movement trajectory to the computer;
the electric control system is electrically connected to the base material driving unit, the first servo module, the second servo module, the third servo sliding table module and the nozzle, and is configured to control movements of the first servo module, the second servo module, the third servo sliding table module and the base material driving unit; the electric control system is communicatively connected to the computer;

a control program is provided in the computer, and comprises a coordinate calibration module, a scanning module, a repairing module, a registration module, a trajectory planning module and a control module; the scanning module is configured to receive data transmitted by the scanning module and convert the data into three-dimensional model data; the coordinate calibration module is configured to unify a coordinate system of the scanning module and a coordinate system of the nozzle driving unit; the registration module is configured to modify and register a scanned three-dimensional model; the repairing module is configured to repair an object in the scanned three-dimensional model and transform the three-dimensional model from the coordinate system of the scanning module to a coordinate system of a machine tool; the trajectory planning module is configured to plan a five-axis printing trajectory of the three-dimensional model after passing through the scanning module, the repairing module and the registration module and send an instruction to the control module; and the control module is configured to receive a trajectory path planning instruction and transmit the trajectory path planning instruction to the electric control system.

2. The five-axis linkage 3D printer according to claim 1, wherein the base material driving unit comprises a trapezoidal swing arm, a first driving motor, a second driving motor and a rotary table; and a groove is provided in the base, the trapezoidal swing arm is arranged in the groove, two ends of the trapezoidal swing arm are rotatably connected to the base, the first driving motor is fixedly installed at a bottom of the trapezoidal swing arm, the first driving motor is connected to the rotary table and drives the rotary table to rotate, and the second driving motor is connected to one end of the trapezoidal swing arm and drives the trapezoidal swing arm to rotate.

3. The five-axis linkage 3D printer according to claim 1, wherein the scanning unit comprises a camera and an adjusting support; and the adjusting support is fixedly installed on the base, the camera is fixedly connected to one end of the adjusting support, and the adjusting support can adjust a distance between the camera and the base.

4. The five-axis linkage 3D printer according to claim 1, wherein a T-shaped support is arranged on a sliding block of the second servo module, one end of the T-shaped support is fixedly connected to the sliding block, and the other end of the T-shaped support is fixedly connected to the third servo sliding table module.

5. The five-axis linkage 3D printer according to claim 2, wherein the first driving motor is a harmonic drive.

6. The five-axis linkage 3D printer according to claim 2, wherein the second driving motor is a harmonic drive.

7. The five-axis linkage 3D printer according to claim 1, wherein the electric control system comprises an electric control cabinet, a control card system is arranged in the electric control cabinet, and the control card system is electrically connected to the base material driving unit, the first servo module, the second servo module, the third servo sliding table module, the nozzle and the scanning unit.

8. The five-axis linkage 3D printer according to claim 2, wherein a fixed support and a supporting seat are arranged on the base, a first bearing seat is arranged on the fixed support, the first bearing seat is rotatably connected to one end of the trapezoidal swing arm, the supporting seat is fixedly installed on the base, a second bearing seat is arranged on a side wall of the supporting seat, the second bearing seat is rotatably connected to the other end of the trapezoidal swing arm, the first bearing seat and the second bearing seat are located at a same height, and the second driving motor is connected to the second bearing seat to drive the trapezoidal swing arm to rotate; and the first servo module is fixedly installed on the supporting seat.

\* \* \* \* \*